United States Patent
Sun et al.

(10) Patent No.: US 12,120,554 B2
(45) Date of Patent: Oct. 15, 2024

(54) TECHNIQUES FOR DYNAMIC TIME DUPLEX DIVISION WITH RESERVATION SIGNAL AND CONTENTION

(71) Applicant: QUALCOMM Incorporated, San Diego, CA (US)

(72) Inventors: Jing Sun, San Diego, CA (US); Chih-Hao Liu, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 17/506,384

(22) Filed: Oct. 20, 2021

(65) Prior Publication Data

US 2023/0124134 A1    Apr. 20, 2023

(51) Int. Cl.
*H04W 28/26* (2009.01)
*H04B 7/26* (2006.01)
*H04W 72/23* (2023.01)

(52) U.S. Cl.
CPC .......... *H04W 28/26* (2013.01); *H04B 7/2656* (2013.01); *H04W 72/23* (2023.01)

(58) Field of Classification Search
CPC . H04W 28/26; H04W 72/23; H04W 72/0446; H04W 72/20; H04B 7/2656
See application file for complete search history.

(56) References Cited

U.S. PATENT DOCUMENTS

| | | | |
|---|---|---|---|
| 10,178,656 B2* | 1/2019 | Zhang | H04L 5/0073 |
| 2016/0021664 A1* | 1/2016 | Chou | H04W 52/0229 370/329 |
| 2016/0302226 A1* | 10/2016 | Kim | H04W 72/23 |
| 2017/0013470 A1* | 1/2017 | Sun | H04W 72/54 |
| 2018/0077725 A1* | 3/2018 | Sun | H04W 28/26 |
| 2018/0131499 A1* | 5/2018 | Zhang | H04W 16/14 |
| 2018/0132261 A1* | 5/2018 | Zhang | H04W 72/1263 |
| 2018/0160437 A1* | 6/2018 | Montojo | H04W 72/0473 |
| 2018/0167848 A1* | 6/2018 | Lei | H04W 72/0453 |
| 2018/0351591 A1* | 12/2018 | Fakoorian | H04L 5/1438 |
| 2019/0081768 A1* | 3/2019 | Zhang | H04L 5/0094 |
| 2019/0082358 A1* | 3/2019 | Asterjadhi | H04W 72/23 |
| 2019/0110302 A1* | 4/2019 | Zhang | H04W 72/12 |
| 2019/0394790 A1* | 12/2019 | Damnjanovic | H04L 27/0006 |
| 2020/0029221 A1* | 1/2020 | Xue | H04W 72/23 |
| 2022/0182212 A1* | 6/2022 | Takeda | H04L 5/1469 |

* cited by examiner

*Primary Examiner* — Ayaz R Sheikh
*Assistant Examiner* — Tarell A Hampton
(74) *Attorney, Agent, or Firm* — Årent Fox LLP/Qualcomm Incorporated

(57) ABSTRACT

Techniques for dynamic time duplex division (TDD) with reservation signal and contention may include a first network node configured to select a first resource to reserve for use of a downlink (DL) transmission or an uplink (UL) transmission. The first network node may also be configured to transmit, to a second network node, a reservation signal on a reservation signal resource to announce that the first resource is reserved for use of the DL transmission or the UL transmission by the first network node. The reservation signal resource may be associated with the first resource.

27 Claims, 11 Drawing Sheets

TECHNIQUES FOR DYNAMIC TIME DUPLEX DIVISION WITH RESERVATION SIGNAL AND CONTENTION

TECHNICAL FIELD

Aspects of the present disclosure relate generally to wireless communications, and more particularly, to techniques for dynamic time duplex division (TDD) with reservation signal and contention.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a first network node, is provided. The method may include selecting a first resource to reserve for use of a DL transmission or a UL transmission. The method may include transmitting, to a second network node, a reservation signal on a reservation signal resource to announce that the first resource is reserved for use of the DL transmission or the UL transmission by the first network node, wherein the reservation signal resource is associated with the first resource.

In another aspect, a first network node is provided. The first network node may include a memory storing instructions and one or more processors coupled with the memory. The first network node may be configured to select a first resource to reserve for use of a DL transmission or a UL transmission. The first network node may be configured to transmit, to a second network node, a reservation signal on a reservation signal resource to announce that the first resource is reserved for use of the DL transmission or the UL transmission by the first network node, wherein the reservation signal resource is associated with the first resource.

In another aspect, a computer-readable medium storing computer-executable code for a first network node, is provided. The computer-readable medium may include code to select a first resource to reserve for use of a DL transmission or a UL transmission. The computer-readable medium may include code to transmit, to a second network node, a reservation signal on a reservation signal resource to announce that the first resource is reserved for use of the DL transmission or the UL transmission by the first network node, wherein the reservation signal resource is associated with the first resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
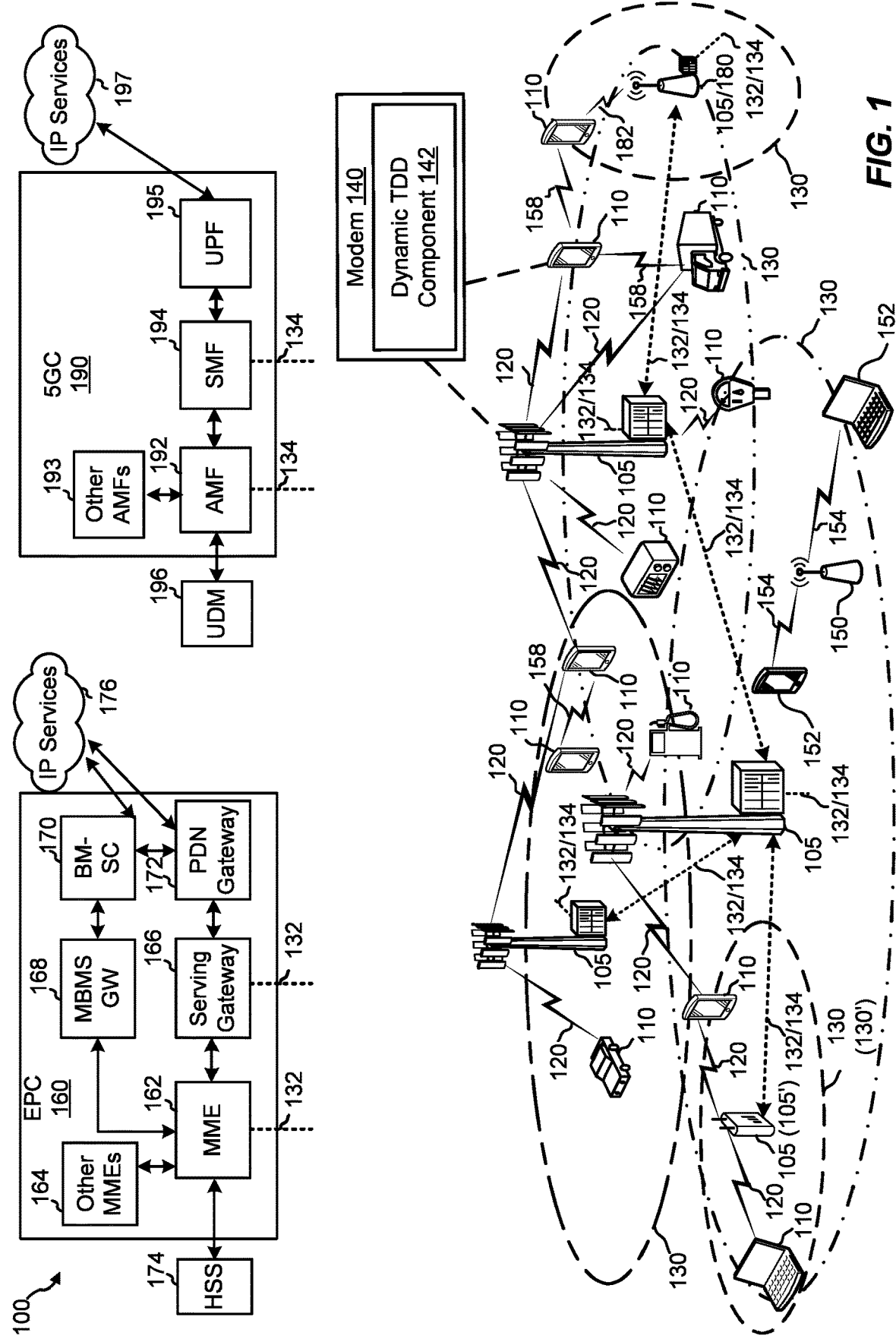
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some situations, dynamic TDD, where a decision for a slot or a symbol to be used for DL transmissions or UL transmissions, may cause signal interference. One method of handling the interference may include the use of dynamic clear-to-send (CTS) or ready-to-send (RTS) signaling between base stations and UEs. However, proposed solutions using dynamic CTS or RTS signaling may result in unnecessary overhead caused by the additional signaling between the base stations and UEs.

Aspects of the present disclosure provide techniques to overcome one or more of the above-disclosed discrepancies. In an example, a network node (e.g., base station or UE) may use a reservation signal to announce that a first resource is being reserved for use of a DL transmission or a UL transmission by the network node. The network node may transmit the reservation signal in a reservation signal resource designated for making the announcement of the reservation, where the reservation signal resource is sent prior to the first resource.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, methods and computer-readable mediums according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In an example, a network node (e.g., base station 105 or UE 110) may include a modem 140 and/or a dynamic TDD component 142 for managing dynamic TDD through the use of reservation signals.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D), or sidelink, communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user and protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
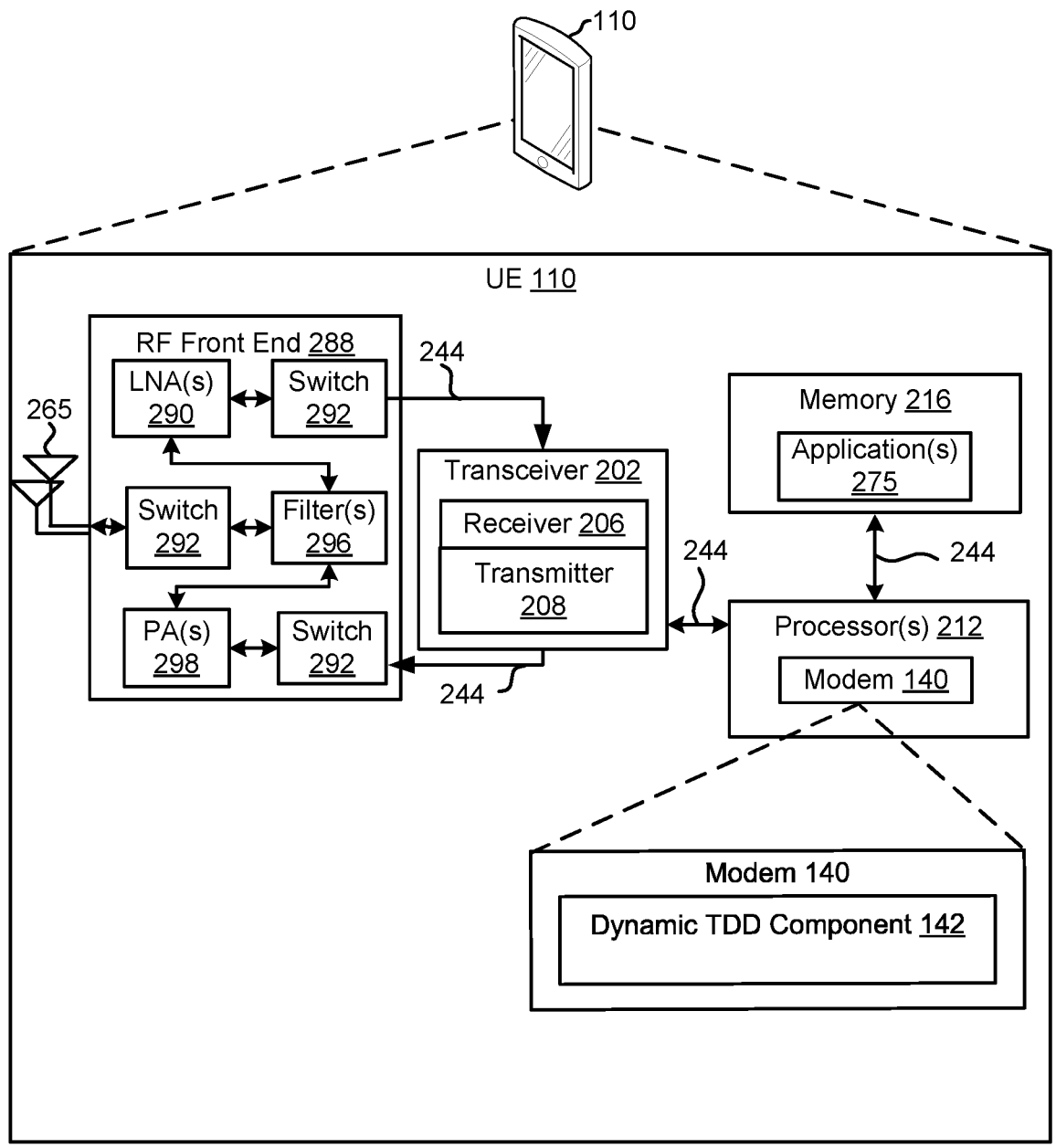
FIG. 2 is a schematic diagram of an example of a user equipment (UE) of FIG. 1, according to aspects of the present disclosure.

Referring to FIG. 2, an example implementation of a UE 110 may include the modem 140 having the dynamic TDD component 142. The modem 140 and/or the dynamic TDD component 142 of the UE 110 may be configured to manage reservation signals and resource reservation.

In some implementations, the UE 110 may include a variety of components, including components such as one or more processors 212 and memory 216 and transceiver 202 in communication via one or more buses 244, which may operate in conjunction with the modem 140 and/or the dynamic TDD component 142 to enable one or more of the functions, described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the dynamic TDD component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the dynamic TDD component 142 may be performed by the transceiver 202.

Also, the memory 216 may be configured to store data used herein and/or local versions of applications 275 or the dynamic TDD component 142 and/or one or more subcomponents of the dynamic TDD component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the dynamic TDD component 142 and/or one or more of its subcomponents, and/or data associated therewith, when the UE 110 is operating at least one processor 212 to execute the dynamic TDD component 142 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the UEs 110, one or more of the base stations 105, or one or more cells associated with one or more of the base stations 105. In an aspect, for example, the modem 140 may configure the transceiver 202 to operate at a specified frequency and power level based on a control entity configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use.

Figure 3:
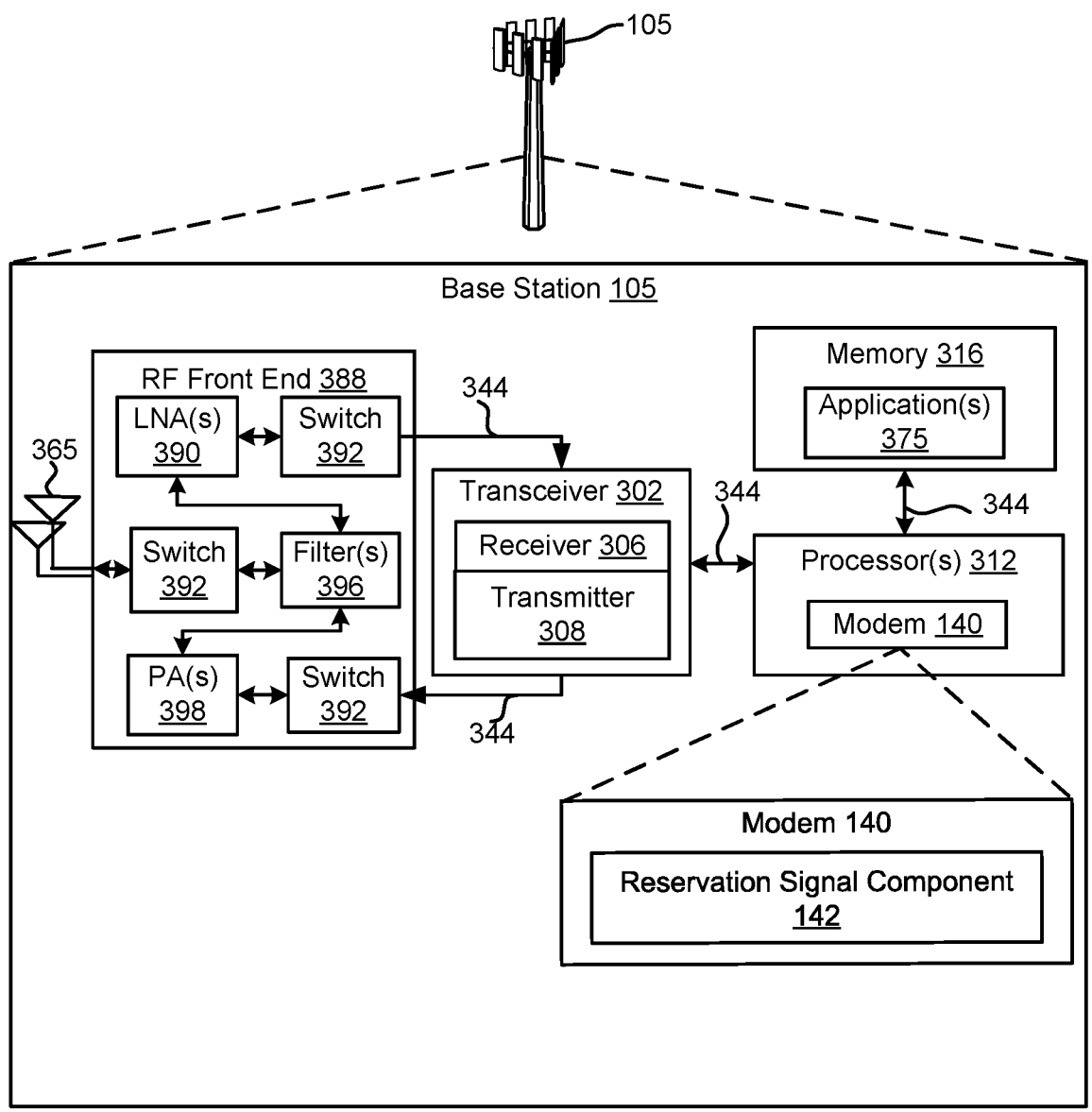
FIG. 3 is a schematic diagram of an example of a base station of FIG. 1, according to aspects of the present disclosure.

Referring to FIG. 3, an example implementation of a base station 105 may include the modem 140 having the dynamic TDD component 142. The modem 140 and/or the dynamic TDD component 142 of the UE 110 may be configured to manage reservation signals and resource reservation.

In some implementations, the base station 105 may include a variety of components, including components such as one or more processors 312 and memory 316 and transceiver 302 in communication via one or more buses 344, which may operate in conjunction with the modem 140 and/or the dynamic TDD component 142 to enable one or more of the functions, described herein. Further, the one or more processors 312, the modem 140, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 140 that uses one or more modem processors. The various functions related to the dynamic TDD component 142 may be included in the modem 140 and/or the processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 140 may configure the base station 105 and the processors 312. In other aspects, some of the features of the one or more processors 312 and/or the modem 140 associated with the dynamic TDD component 142 may be performed by the transceiver 302.

Also, the memory 316 may be configured to store data used herein and/or local versions of applications 375, or the dynamic TDD component 142 and/or one or more subcomponents of the dynamic TDD component 142 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the dynamic TDD component 142 and/or one or more of the subcomponents, and/or data associated therewith, when the base station 105 is operating at least one processor 312 to execute the dynamic TDD component 142 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by the base stations 105 or wireless transmissions transmitted by the UEs 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, the transceiver 302 may be tuned to operate at specified frequencies such that the base station 105 may communicate with, for example, the UEs 110, the base station 105, or one or more cells associated with one or more of the base station 105. In an aspect, for example, the modem 140 may configure the transceiver 302 to operate at a specified frequency and power level based on the repeater configuration of the base station 105 and the communication protocol used by the modem 140.

In an aspect, the modem 140 may be a multiband-multimode modem, which may process digital data and communicate with the transceiver 302 such that the digital data is sent and received using the transceiver 302. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the base station 105 (e.g., RF front end 388, transceiver 302) to enable transmission and/or reception of signals from the network based on a specified modem configuration. In an aspect, the modem configuration may be based on the mode of the modem 140 and the frequency band in use.

Figure 4:
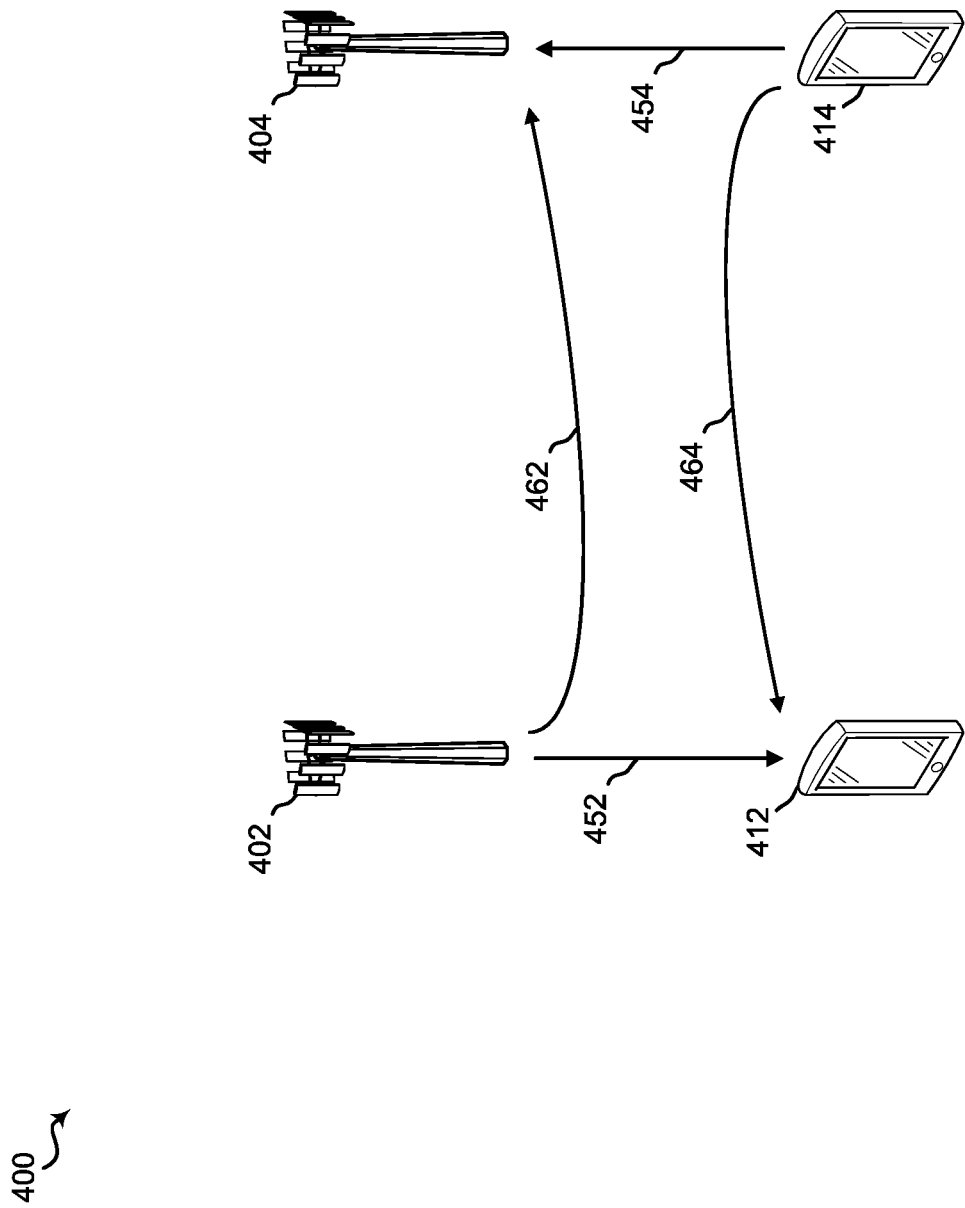
FIG. 4 is a block diagram of example wireless communications between UEs and base stations of FIG. 1, according to aspects of the present disclosure.

Referring to FIG. 4, a first base station 402 may communicate with a first UE 412 via a desired DL transmission 452, and a second UE 414 may communicate with a second base station 404 via a desired UL transmission 454. The first base station 402 and the second base station 404 may be examples of the base station 105 of FIG. 1, and the first UE 412 and the second UE 414 may be examples of the UE 110 of FIG. 1. Depending on traffic requirements, instead of a fixed DL/UL pattern there may be motivation to perform dynamic TDD where the decision for a slot/symbol to be DL or UL is dynamically determined. However, this may cause DL-to-UL interference 462 between the first base station 402 and the second UE 414 or UL-to-DL interference 464 between the first UE 412 and the second UE 414.

Different ways may be used to handle the DL-to-UL interference 462 and the UL-to-DL interference 464. For example, semi-static interference measurements and scheduling based on jamming graphs may be used. This may be captured by, for example NR cross-link interference (CLI) and remote interference management (RIM) framework. In another example, dynamic clear-to-send (CTS)/ready-to-send (RTS) signaling between UEs and BSs may be used.

Figure 5:
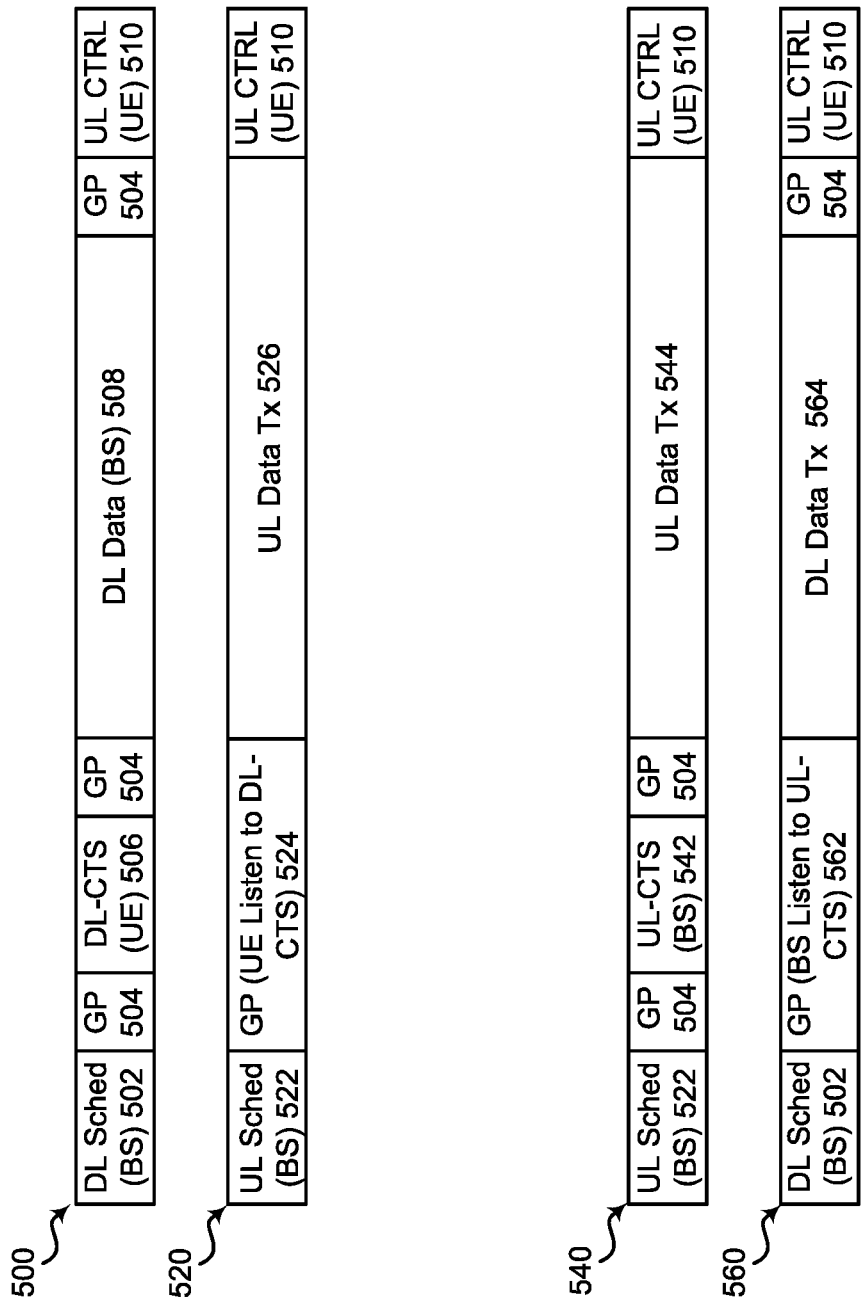
FIG. 5 illustrates conceptual diagrams of slot scenarios, according to aspects of the present disclosure.

Referring to FIG. 5, example default slot scenarios have been proposed for LTE with dynamic TDD decision but have not been adopted by LTE standards. In an example, a default DL slot 500 for a victim link (e.g., link for base station 105 or UE 110 that receives interference) may include a DL schedule region (e.g., resources) 502 for the base station 105, a plurality of guard period regions 504, a DL-CTS region 506 for the UE 110, a DL data region 508 for the base station 105, and a UL control region 510 for the UE 110. Further, a default DL slot 520 for an aggressor link (e.g., base station 105 or UE 110 that causes interference) may include a UL schedule region 522 for the base station 105, a guard period region 524 (which allows UE 105 to listen to DL-CTS region 506), a UL data region 526 (which are only used if DL-CTS region 506 is not detected) for the UE 110, and a UL control region 510 for the UE 110.

In another example, a default UL slot 540 for a victim link may include a UL schedule region 522 for the base station 105, a plurality of guard period regions 504, a UL-CTS region 542 for the base station 105, a UL data region 544 for the UE 110, and a UL control region 510 for the UE 110. Further, a default UL slot 560 for an aggressor link may include a DL schedule region 502 for the base station 105, a guard period region 562 (which allows base station 105 to listen to UL-CTS region 542), a DL data region 564 (which are only used if UL-CTS region 542 is not detected) for the base station 105, a guard period region 504, and a UL control region 510 for the UE 110.

As illustrated by FIG. 5, in these scenarios, a subframe/slot may include a default direction (e.g., DL or UL), and DL-CTS or UL-CTS transmissions are included in the slots for default DL and default UL scenario respectively. Further, as noted above, the transmission of a non-default direction may happens if a CTS (e.g., DL-CTS or UL-CTS) is not detected (e.g., no device is using the default direction). However, use of these scenarios may require extra overhead (e.g., additional signaling and communication between devices) for CTS transmissions and may include a rigid structure of the slots.

Figure 6:
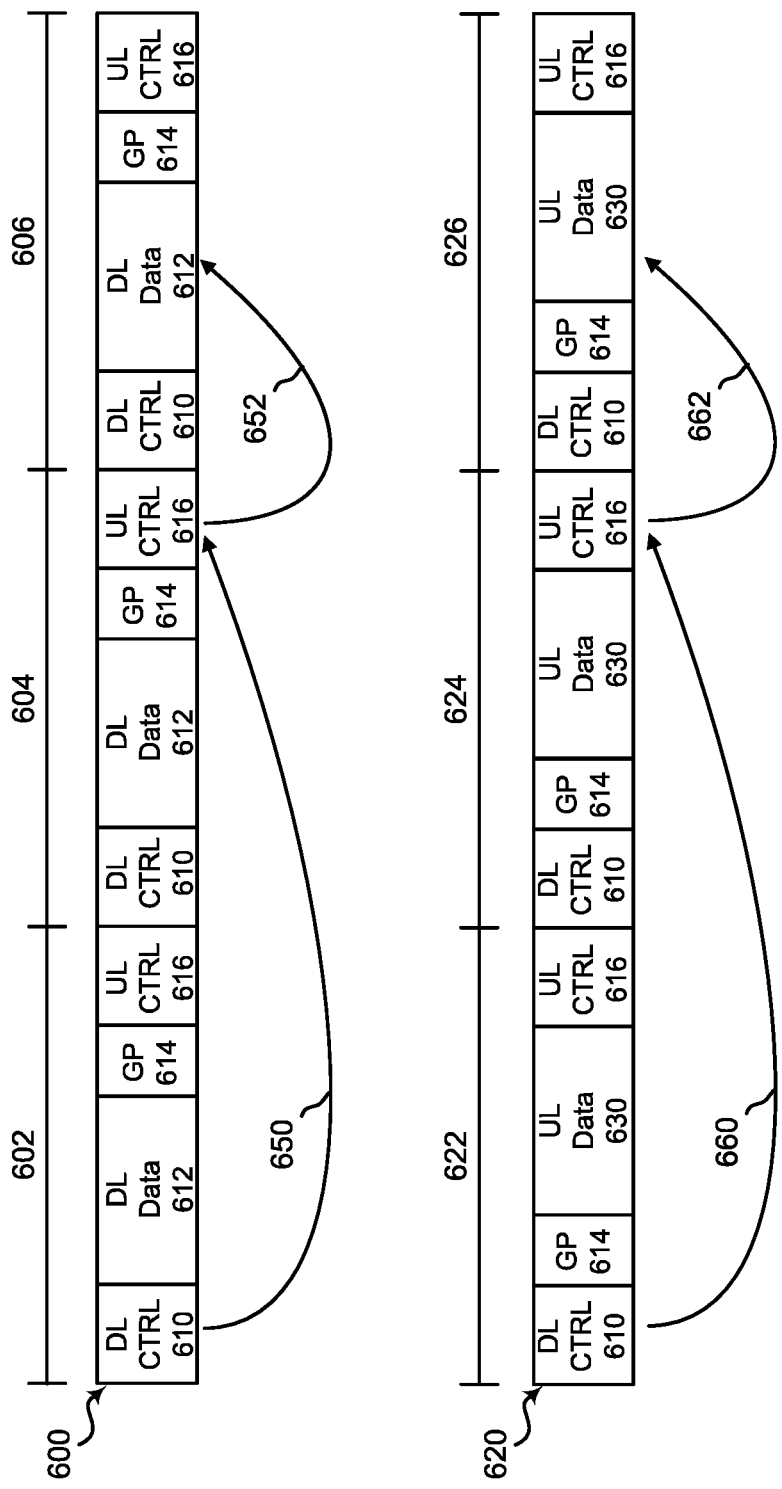
FIG. 6 illustrates conceptual diagrams of dynamic TDD slot scenarios, according to aspects of the present disclosure.

Referring to FIG. 6, additional scenarios for dynamic TDD decision may include DL configuration information (DCI) triggered CTS transmission. For example, a frame/subframe 600 for a victim link may include a plurality of slots, including a first slot 602, a second slot 604, and a third slot 606. Each of these slots may include a DL control region 610, a DL data region 612, a guard period region 614, and a UL control region 616. In an example, a DL grant may trigger DL-CTS transmission in a UL control region in a different slot/symbol, and the same DL grant may grant DL data transmission in a data region. For example, at trigger 650, a DL grant from the DL control region 610 of the first slot 602 may trigger a DL-CTS transmission in the UL control region 616 of the second slot 604, and, at trigger 652, the DL grant may grant transmission of DL data from the DL data region 612 of the third slot 606.

In another example, a frame/subframe 620 for an aggressor link may include a plurality of slots, including a first slot 622, a second slot 624, and a third slot 626. Each of these slots may include a DL control region 610, a guard period region 614, an UL data region 630, and a UL control region 616. In an example, a UL grant may trigger DL-CTS monitoring in a UL control region in a different slot/symbol, and the same UL grant may grant UL data transmission in a data region. For example, at trigger 660, a UL grant from the DL control region 610 of the first slot 622 may trigger a DL-CTS transmission in the UL control region 616 of the second slot 624, and, at trigger 662, the UL grant may grant transmission of UL data from the UL data region 630 of the third slot 626.

A DCI triggered CTS transmission may avoid the need for dedicated CTS segments in a slot structure, as illustrated by FIG. 5. Further, the CTS of the UE 110 may be transmitted in the UL control region.

Aspects of the present disclosure overcome the deficiencies of the previously described scenarios of FIGS. 5 and 6 by describing a more flexible structure which may not include a pre-determined DL and UL direction for a slot, and may support subband full duplex implementations, where one subband is a DL subband and another subband is a UL subband.

For the structure of FIG. 4, the following scenarios are considered: Scenario 1—the first base station 402 (DL) to the second base station 404 (UL) interference, with the first base station 402 (DL) having priority (e.g., second base station 404 (UL) backs off); Scenario 2—the first base station 402 (DL) to the second base station 404 (UL) interference, with the second base station 404 (UL) having priority (e.g., first base station 402 (DL) backs off); Scenario 3—the second UE 414 (UL) to the first UE 412 (DL) interference, with the second UE 414 (UL) having priority (e.g., first UE 412 (DL) backs off); and Scenario 4—the second UE 414 (UL) to the first UE 412 (DL) interference, with the first UE 412 (DL) having priority (e.g., second UE 414 (UL) backs off).

These scenarios may be generalized to the following two scenarios: Scenario A—transmitter to receiver interference, with the transmitter having priority (and receiver backs off), covering scenarios 1 and 3; and Scenario B—transmitter to receiver interference, with the receiver having priority (and transmitter backs off), covering scenarios 2 and 4.

Figure 7:
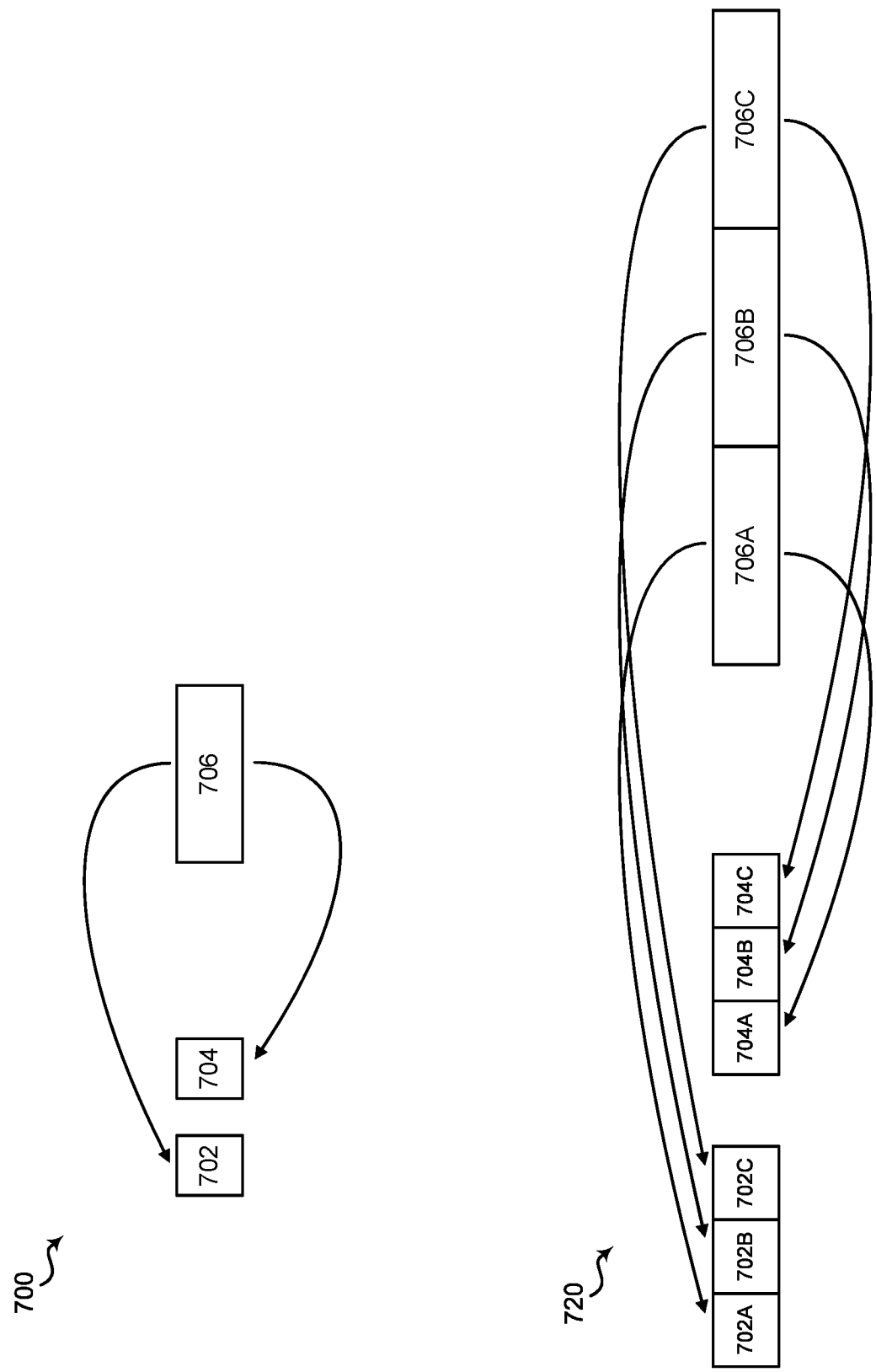
FIG. 7 illustrates conceptual diagrams of reservation signals for dynamic TDD, according to aspects of the present disclosure.

Referring to FIG. 7, for a resource (e.g., a set of symbols or slots, or a set of resource blocks (RBs) or subbands), a reservation signal resource may be introduced before the resource and may announce reservation of the resource. In an example, separate reservation signal resources to reserve a resource for transmission and to reserve the resource for reception may be implemented. In another example, the reservation signal resources for transmission and reception may be time division multiplexed (TDM), so nodes that reserve the resource for transmission (or reception) can hear the reservation signal from nodes that reserve the resource for reception (or transmission).

In a first example 700, a transmission (Tx) reservation signal (RS) resource 702 may be used to announce the reservation of the resource 706 for transmission, and a reception (Rx) RS resource 704 may be used to announce the reservation of the resource 706 for reception. In a second example 720, a Tx RS resource 702A, 702B, or 702C may be used to announce the reservation of a respective resource 706A, 706B, or 706C for transmission, and an Rx RS resource 704A, 704B, or 704C may be used to announce the reservation of the respective resource 706A, 706B, or 706C for reception.

Figure 8:
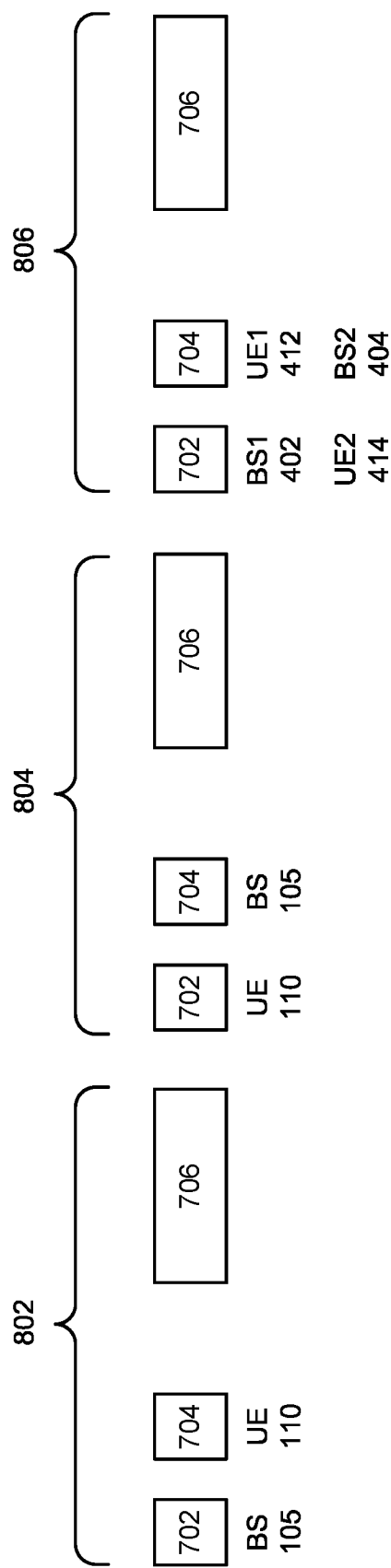
FIG. 8 illustrates additional conceptual diagrams of reservation signals for dynamic TDD, according to aspects of the present disclosure.

Referring to FIG. 8, a node (e.g., base station (BS) 105 or UE 110) that intends to use a resource 706 may need to monitor the Tx RS resource 702 or the Rx RS resource 704 if the node is not transmitting (or announcing) at the Tx RS resource 702 or the Rx RS resource 704, thereby allowing reservations of other directions (e.g., DL or UL). By monitoring the Tx RS resource 702 or the Rx RS resource 704, the node can determine if another node is transmitting on the Tx RS resource 702 or the Rx RS resource 704, and the node can determine whether to back off, or not (e.g., depending on priority).

In an example, for a DL transmission scenario 802, the base station 105 may transmit an RS at the Tx RS resource 702, and the UE 110 may transmit an RS at the Rx RS resource 704. In this example, the base station 105 may monitor the Rx RS resource 704 to pick up another reservation of the base station 105 for UL, and the UE 110 may monitor the Tx RS resource 702 to pick up another reservation of the UE 110 for UL. Here, the base station 105 may indicate to the UE 110 about the DL transmission, so the UE 110 can send the Rx RS resource 704 and monitor the Tx RS resource 702.

In another example, for a UL transmission scenario 804, the base station 105 may transmit an RS at the Rx RS resource 704 and the UE 110 may transmit an RX at the Tx RS resource 702. The base station 105 may monitor the Tx RS resource 702 to pick up another reservation of the base station 105 for DL, and the UE 110 may monitor the Rx RS resource 704 to pick up another reservation of the UE 110 for DL. In this case, the base station 105 may indicate to the UE 110 about a future UL transmission, so the UE 110 can send the Tx RS resource 702 and monitor the Rx RS resource 704.

In another example, for a contention reservation scenario 806, two base stations (e.g., first base station 402 (BS1) and second base station 404 (BS2)) and two UEs (e.g., first UE 412 (second UE 414) and second UE 414 (UE2)) may use the Tx RS resource 702 and the Rx RX resource 704, where the first base station 402 and the first UE 412 are set up to use the DL transmission scenario 802 and the second base station 404 and the second UE 414 are set up to use the UL transmission scenario 804. Based on this scenario, there is contention in the reservation as the resource 706 may be reserved in both directions (e.g., DL or UL).

In an aspect, to associate a RS with a resource 706 to be reserved, an radio resource control (RRC) configuration may be used to associate the resource 706 to be reserved with the Tx RS resource 702 and/or the Rx RS resource 704, thereby using a one-to-one mapping of the Tx RS resource 702 and the Rx RS resource 704 with the resource 706. In another aspect, an RRC configuration with a dynamic indication from the base station 105 in a DCI may be used. For example, multiple resources may be pre-configured for the Tx RS resource 702 and/or the Rx RS resource 704 may be indicated in a field of the DCI, thereby using a one-to-many mapping of the Tx RS resource 702 and the Rx RS resource 704 with a plurality of resources 706.

Properties of an RS may include a waveform, where a base station transmission waveform and a UE transmission waveform for the RS may not need to be distinguished. In other words, a same waveform, such as a channel state information reference signal (CSI-RS) based waveform or a sounding reference signal (SRS) based waveform, may be used for the RSs for simplicity of detection.

For example, for a DL reservation, the first base station 402 may monitor the Rx RS resource 704 while the first UE 412 may transmit at the Rx RS resource 704. In this example, the first base station 402 should be able to distinguish the Rx RS transmission transmitted from the first UE 412 and from other base station 105. The first base station 402 may not need to distinguish the Rx RS transmission transmitted from the first UE 412 and from other UEs 110. If other UEs 110 are transmitting the Rx RS transmission, these UEs 110 may be reserving the Rx RS resource 704 for DL transmission as well, in the same direction as the first base station 402 to the first UE 412 transmission (e.g., DL transmission). This issue may apply for UL reservations as well.

In an aspect, for the same resource to be reserved, the Tx RS transmission (or Rx RS transmission) for a DL reservation and a UL reservation can be in the same time domain resources, but needs to use a different resource. In an example, different resources in frequency domain or code domain may be used. In this example, a node (e.g., base station 105 or UE 110) may know an RX is for a DL transmission or a UL transmission. Further, a node may not need to know which node transmitted the RS, but may know a UE 110 or a base station 105 transmitted the RS, or effectively, the RS is for a DL transmission or a UL transmission. In another example, for the RSs in the same direction, the Tx RS transmission (or Rx RS transmission) may use a system frame number (SFN) for a same resource. Use of the SFN may reduce a number of separate detections needed. Further, there may be a single detection for all SFN'ed transmissions.

Figure 9:
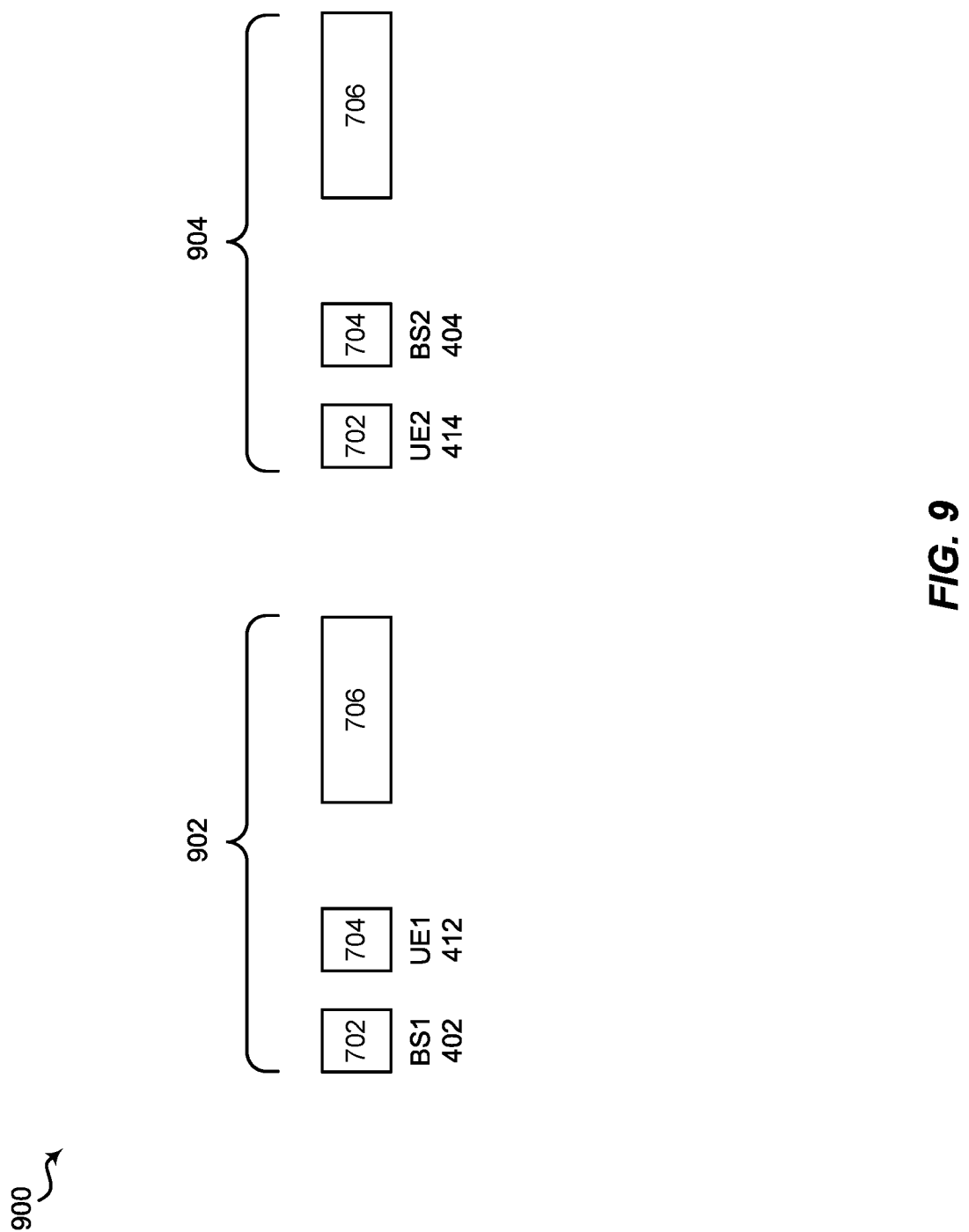
FIG. 9 illustrates additional conceptual diagrams of reservation signals for dynamic TDD, according to aspects of the present disclosure.

Referring to FIG. 9, examples of default priority 900 may include a pre-determined priority (either DL or UL) for a resource 706. In an example, a first scenario 902 may include the DL being the high priority, and a second scenario 904 may include the UL being the high priority. The determination between high priority of the DL or the UL may be based on some backhaul negotiation, and an RRC configuration may be used to indicate to the UE 110 the prioritized direction of resources 706. In these examples, the RS for the low priority direction (e.g., UL in first scenario 902; DL in second scenario 904) may not need to be transmitted. In an example, nodes that may intend to use the low priority direction may monitor the high priority direction RS and only use a channel if a high priority direction RS is not detected.

In the first scenario 902, the second base station 404 may intend to use the resource 706 for UL, and may detect if any node (e.g., first base station 402 or first UE 412) is using the resource 706 for DL. The second base station 404 may monitor the RS for DL transmission, and the second UE 414 may monitor the RS for DL reception. In this example, if either the second base station 404 or the second UE 414 detects the RS, this means a node (e.g., first base station 402 or first UE 412) is going to transmit on the resource 706 and therefore the UL will backoff (e.g., neither second base station 404 or second UE 414 will attempt to use the resource 706 for UL).

In an example, the second base station 404 may signal to the second UE 414 to sense for a DL reservation for a resource 706 (e.g., not by UL grant). If the second base station 404 senses the Tx RS transmission for the first base station 402, the second base station 404 may not send a UL grant. If the second UE 414 senses the Rx RS transmission for the first UE 412, some feedback to second base station 404 may be sent so the second base station 404 can use the resource 706 in a different manner (e.g., for UL purposes). Alternatively, if the second UE 414 does not indicate to the second base station 404 the sensing results, the second base station 404 may send the UL grant, and the second UE 414 will not transmit on the resource 706 (e.g., waste of resource).

In the second scenario 904, the first base station 402 may intend to use the resource 706 for DL, and may detect if any node (e.g., second base station 404 or second UE 414) is using the resource 706 for UL. The first base station 402 monitor the RS for UL reception, and the first UE 412 may monitor the RS for UL transmission. If either the first base station 402 or the first UE 412 detect the RS, the DL will backoff.

In an example, the first base station 402 may signal to the first UE 412 to sense for the UL reservation for the resource 706 (e.g., not by DL grant). If the first UE 412 senses the Tx RS for the second UE 414, the first UE 412 may signal the first base station 402 to decline the DL grant. If the first base station 402 senses the Rx RS for the second base station 404, the first base station 402 may not transmit the DL grant. However, the first base station 402 may use the resource 706 for UL still, or DL to some other direction.

In another aspect, explicit priority may be implemented by the nodes. In this case, there is no pre-determined default direction for the resource 706. Instead, for each transmission reservation, there is a priority associated to the reservation. In this example, a higher priority reservation may use the resource 706.

In an aspect, an RS (e.g., Tx RS 702 or Rx RS 704) may explicitly carry a priority of the reservation. The priority may be, for example, carried in the payload of the RS, indicated by the sequence used by the RS, or indicated by the location of the RS. In this example, a node (e.g., base station 105 or UE 110) may monitor the RS when it is not transmitting, and determine the highest priority reserving a channel.

In another aspect, when a node monitors the RS (e.g., Tx RS resource 702 or Rx RS resource 704), the node may monitor the RS for both a reservation direction of the RS and the opposite reservation direction of the RS. For each reservation direction, the node may identify the highest priority and assume the reservation direction with the higher highest priority will win the reservation. If the winning direction is the same direction of the node, the node may assume its reservation won.

To support the explicit priority case, RSs for different priority may be distinguishable, and RSs for DL direction or UL direction (or transmitted by base station 105 or UE 110) may be distinguishable. However, a node may not need to know which base station 105 or UE 110 transmitted the RS. In an example, an SFN transmission for the RS for the same direction with the same priority may be used.

Figure 10:
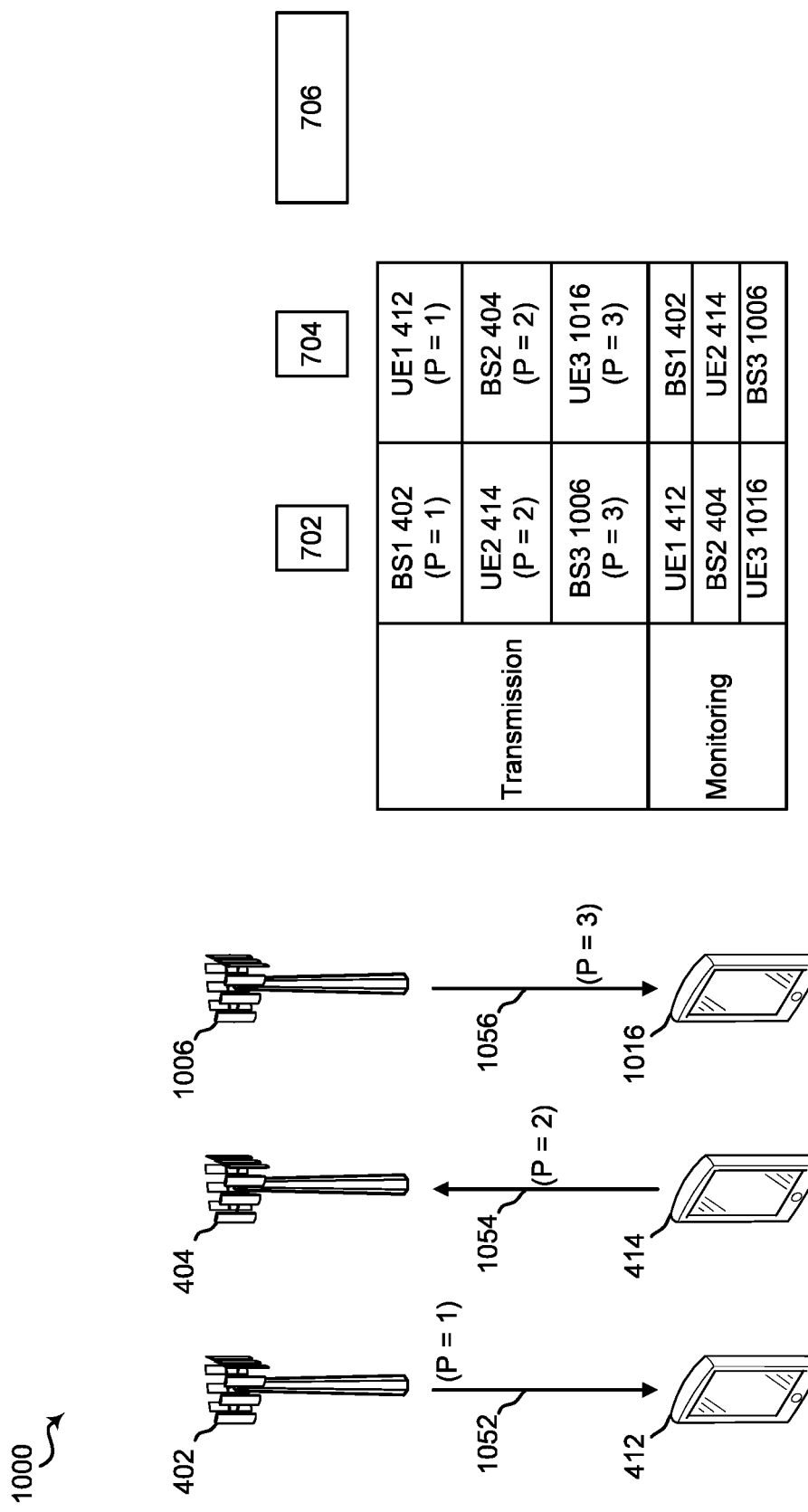
FIG. 10 illustrates conceptual diagrams of priority for reservation signals for dynamic TDD, according to aspects of the present disclosure.

Referring to FIG. 10, an example implementation 1000 of explicit priority may include the first base station 402 (BS1) communicating by DL communication 1052 with the first UE 412 (UE1), the second base station 404 (BS2) communicating by UL communication 1054 with the second UE 414 (UE2), and a third base station 1006 (BS3) communicating by DL communication 1056 with a third UE 1016 (UE3). In this example, for the Tx RS resource 702, the first base station 402, the second UE 414, and the third base station 1006 may be assigned to transmit on the Tx RS resource 702, and the first UE 412, the second base station 404, and the third UE 1016 may be assigned to monitor (or detect) the Tx RS resource 702. For the Rx RS resource 704, the first UE 412, the second base station 404, and the third UE 1016 may be assigned to transmit on the Rx RS resource 704, and the first base station 402, the second UE 414, and the third base station 1006 may be assigned to monitor (or detect) on the Rx RS resource 704. In general, not all nodes assigned to monitor (or detect) an RS can detect a transmitted RS, as this may depend on a distance between the transmitter of the RS and the detector of the RS.

In this example, a priority (e.g., P=1) of the DL communication 1052 is less than a priority (e.g., P=2) of the UL communication 1054, and the priority (e.g., P=2) of the UL communication 1054 is less than a priority (e.g., P=3) of the DL communication 1056.

In an example, while the first UE 412 is monitoring the Tx RS resource 702, the first UE 412 may determine (e.g., obtaining priority value in RS) that the priority of the second UE 414 has a priority (e.g., P=2) greater than the priority (e.g., P=1) of the first UE 412. If the first UE 412 only determines the second UE 414 having a higher priority, the first UE 412 may backoff (e.g., not attempt to transmit on resource 706). However, the first UE 412 may also determine that the third base station 1006 has a higher priority (e.g., P=3). In this case, the first UE 412 will conclude the DL reservation of the resource 706 may occur, because the priority of the first UE 412 is lower than the priority of the other nodes. Similarly, for the Rx RS resource 704, the first base station 402 may determine (e.g., obtaining priority value in RS) that the priority (e.g., P=3) of the third UE 1016 has a higher priority that the priority of the first base station 402 (P=0), and will conclude that the DL reservation of the resource 706 may occur.

Figure 11:
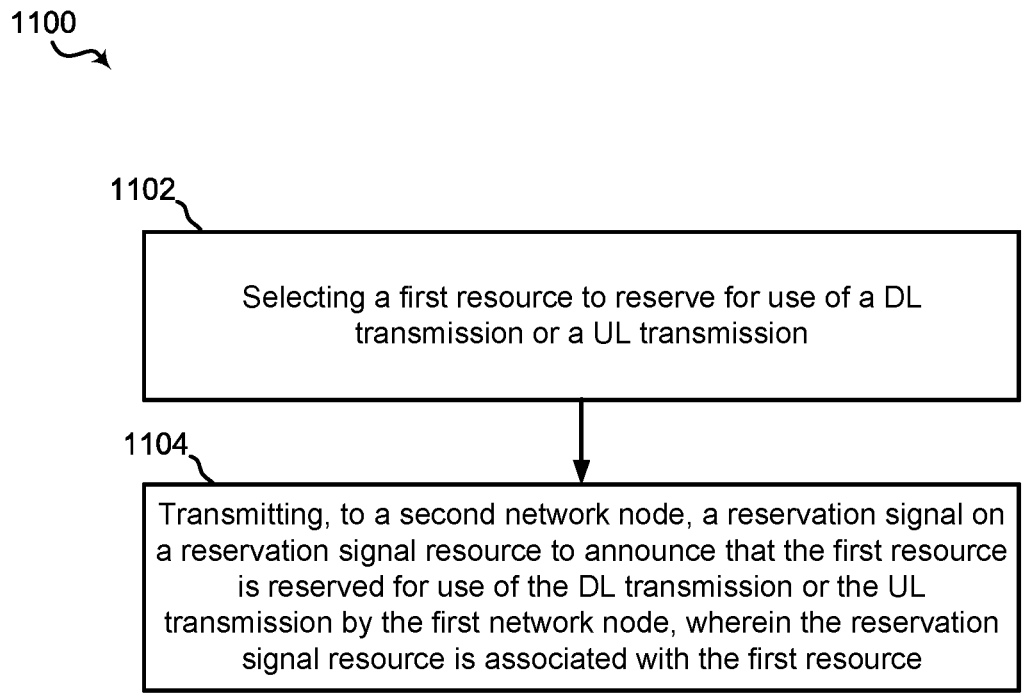
FIG. 11 is flowchart of an example method performed by a network node (e.g., base station or UE of FIG. 1), according to aspects of the present disclosure.

Referring to FIG. 11, an example of a method 1100 for wireless communications may be performed by a network node (e.g., base station 105 or UE 110) of the wireless communication network 100. For example, operations of the method 1100 may be performed by the dynamic TDD component 142, the modem 140, the transceiver 202/302, the processor 212/312, the memory 216/316, and or any other component/subcomponent of the base station 105 or the UE 110.

At block 1102, the method 1100 may include selecting a first resource to reserve for use of a DL transmission or a UL transmission. For example, the dynamic TDD component 142, the modem 140, the transceiver 202/302, the processor 212/312, and/or the memory 216/316 of the base station 105 or UE 110, and/or one or more additional components/subcomponents of the base station 105 or the UE 110 may be configured to or may comprise means for selecting a first resource to reserve for use of a DL transmission or a UL transmission.

For example, the selecting of the first resource at block 1102 may include selecting by the dynamic TDD component 142, the modem 140, the transceiver 202/302, the processor 212/312, and/or the memory 216/316 of the base station 105 or the UE 110, the resource 706 of FIG. 7 to reserve for use of a DL transmission or a UL transmission.

At block 1104, the method 1100 may include transmitting, to a second network node, a reservation signal on a reservation signal resource to announce that the first resource is reserved for use of the DL transmission or the UL transmission by the first network node, wherein the reservation signal resource is associated with the first resource. For example, the dynamic TDD component 142, the modem 140, the transceiver 202/302, the processor 212/312, and/or the memory 216/316 of the base station 105 or the UE 110, and/or one or more additional components/subcomponents of the base station 105 or the UE 110 may be configured to or may comprise means for transmitting, to a second network node, a reservation signal on a reservation signal resource to announce that the first resource is reserved for use of the DL transmission or the UL transmission by the first network node, wherein the reservation signal resource is associated with the first resource.

For example, the transmitting of the reservation signal at block 1104 may include transmitting by the dynamic TDD component 142, the modem 140, the transceiver 202/302, the processor 212/312, and/or the memory 216/316 of the base station 105 or the UE 110, to a second network node (e.g., UE 110 or base station 105), a reservation signal on the reservation signal resource (e.g., Tx RS resource 702 or Rx RS resource 704) to announce that the resource 706 is reserved for use of the DL transmission or the UL transmission by the base station 105 or the UE 110, wherein the reservation signal resource (e.g., Tx RS resource 702 or Rx RS resource 704) is associated with the resource 706.

Additional Implementations

An example method of wireless communication by a first network node, comprising: selecting a first resource to reserve for use of a DL transmission or a UL transmission; and transmitting, to a second network node, a reservation signal on a reservation signal resource to announce that the first resource is reserved for use of the DL transmission or the UL transmission by the first network node, wherein the reservation signal resource is associated with the first resource.

The above-example method, wherein the reservation signal resource includes a transmission resource and a reception resource that are associated with the first resource.

One or more of the above-example methods, further comprising: receiving a configuration signal indicating that the transmission resource or the reception resource is associated with the first resource.

One or more of the above-example methods, wherein the transmission resource and the reception resource are in a same time domain but are separate resources.

One or more of the above-example methods, wherein the reservation signal includes an SFN to indicate the DL transmission or the UL transmission.

One or more of the above-example methods, wherein the first network node is a base station and the second network node is a UE, and wherein the method further comprises: transmitting the reservation signal on the transmission resource for the DL transmission, or on the reception resource for the UL transmission; and monitoring the reception resource for the DL transmission or the transmission resource for the UL transmission to determine a reservation of the first resource by another base station.

One or more of the above-example methods, further comprising: transmitting, to the UE, an indication of the DL transmission by the base station to inform the UE to transmit on the reception resource and monitor the transmission resource, or an indication of the UL transmission by the base station to inform the UE to transmit on the transmission resource and monitor the reception resource.

One or more of the above-example methods, wherein the first network node is a UE and the second network node is a base station, and wherein the method further comprises: transmitting the reservation signal on the reception resource for the DL transmission, or on the transmission resource for the UL transmission; and monitoring the transmission resource for the DL transmission or the reception resource for the UL transmission to determine a reservation of the first resource by another UE.

One or more of the above-example methods, further comprising: monitoring the reservation signal resource to determine a priority of a second reservation signal from another node, wherein use of the first resource by the first network node is in response to a priority of the reservation signal being greater than the priority of the second reservation signal.

One or more of the above-example methods, wherein the priority of the reservation signal and the priority of the second reservation signal are based on whether the first resource is being used for the DL transmission or the UL transmission.

One or more of the above-example methods, wherein the priority of the second reservation signal is indicated in the second reservation signal.

An example first network node, comprising: a memory storing instructions; and one or more processors coupled with the memory and configured to execute the instructions to: select a first resource to reserve for use of a DL transmission or a UL transmission; and transmit, to a second network node, a reservation signal on a reservation signal resource to announce that the first resource is reserved for use of the DL transmission or the UL transmission by the first network node, wherein the reservation signal resource is associated with the first resource.

The above-example first network node, wherein the reservation signal resource includes a transmission resource and a reception resource that are associated with the first resource.

One or more of the above-example first network nodes, wherein the one or more processors are further configured to execute the instructions to receive a configuration signal indicating that the transmission resource or the reception resource is associated with the first resource.

One or more of the above-example first network nodes, wherein the transmission resource and the reception resource are in a same time domain but are separate resources.

One or more of the above-example first network nodes, wherein the reservation signal includes an SFN to indicate the DL transmission or the UL transmission.

One or more of the above-example first network nodes, wherein the first network node is a base station and the second network node is a UE, and wherein the one or more processors are further configured to execute the instructions to: transmit the reservation signal on the transmission resource for the DL transmission, or on the reception resource for the UL transmission; and monitor the reception resource for the DL transmission or the transmission resource for the UL transmission to determine a reservation of the first resource by another base station.

One or more of the above-example first network nodes, wherein the one or more processors are further configured to execute the instructions to: transmit, to the UE, an indication of the DL transmission by the base station to inform the UE to transmit on the reception resource and monitor the transmission resource, or an indication of the UL transmission by the base station to inform the UE to transmit on the transmission resource and monitor the reception resource.

One or more of the above-example first network nodes, wherein the first network node is a UE and the second network node is a base station, and wherein the one or more processors are further configured to execute the instructions to: transmit the reservation signal on the reception resource for the DL transmission, or on the transmission resource for the UL transmission; and monitor the transmission resource for the DL transmission or the reception resource for the UL transmission to determine a reservation of the first resource by another UE.

One or more of the above-example first network nodes, wherein the one or more processors are further configured to execute the instructions to: monitor the reservation signal resource to determine a priority of a second reservation signal from another node, wherein use of the first resource by the first network node is in response to a priority of the reservation signal being greater than the priority of the second reservation signal.

One or more of the above-example first network nodes, wherein the priority of the reservation signal and the priority of the second reservation signal are based on whether the first resource is being used for the DL transmission or the UL transmission.

One or more of the above-example first network nodes, wherein the priority of the second reservation signal is indicated in the second reservation signal.

An example computer-readable medium storing computer-executable code for a first network node, the computer-readable medium comprising code to: select a first resource to reserve for use of a DL transmission or a UL transmission; and transmit, to a second network node, a reservation signal on a reservation signal resource to announce that the first resource is reserved for use of the DL transmission or the UL transmission by the first network node, wherein the reservation signal resource is associated with the first resource.

The above-example computer-readable medium, wherein the reservation signal resource includes a transmission resource and a reception resource that are associated with the first resource.

One or more of the above-example computer-readable mediums, further comprising code to: receive a configuration signal indicating that the transmission resource or the reception resource is associated with the first resource.

One or more of the above-example computer-readable mediums, wherein the transmission resource and the reception resource are in a same time domain but are separate resources.

One or more of the above-example computer-readable mediums, wherein the reservation signal includes an SFN to indicate the DL transmission or the UL transmission.

One or more of the above-example computer-readable mediums, wherein the first network node is a base station and the second network node is a UE, and wherein the computer-readable medium further comprises code to: transmit the reservation signal on the transmission resource for the DL transmission, or on the reception resource for the UL transmission; and monitor the reception resource for the DL transmission or the transmission resource for the UL transmission to determine a reservation of the first resource by another base station.

One or more of the above-example computer-readable mediums, further comprising code to: transmit, to the UE, an indication of the DL transmission by the base station to inform the UE to transmit on the reception resource and monitor the transmission resource, or an indication of the UL transmission by the base station to inform the UE to transmit on the transmission resource and monitor the reception resource.

One or more of the above-example computer-readable mediums, wherein the first network node is a UE and the second network node is a base station, and wherein the computer-readable medium further comprises code to: transmit the reservation signal on the reception resource for the DL transmission, or on the transmission resource for the UL transmission; and monitor the transmission resource for the DL transmission or the reception resource for the UL transmission to determine a reservation of the first resource by another UE.

One or more of the above-example computer-readable mediums, further comprising code to: monitor the reservation signal resource to determine a priority of a second reservation signal from another node, wherein use of the first resource by the first network node is in response to a priority of the reservation signal being greater than the priority of the second reservation signal.

One or more of the above-example computer-readable mediums, wherein the priority of the reservation signal and the priority of the second reservation signal are based on whether the first resource is being used for the DL transmission or the UL transmission.

One or more of the above-example computer-readable mediums, wherein the priority of the second reservation signal is indicated in the second reservation signal.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a first network node, comprising:
   selecting a first resource to reserve for use of a downlink (DL) transmission or an uplink (UL) transmission; and
   transmitting, to a second network node, a reservation signal on a reservation signal resource to announce that the first resource is reserved for use of the DL transmission or the UL transmission by the first network node, wherein the reservation signal resource is associated with the first resource and includes a system frame number (SFN) to indicate the DL transmission or the UL transmission.

2. The method of claim 1, wherein the reservation signal resource includes a transmission resource and a reception resource that are associated with the first resource.

3. The method of claim 2, further comprising:
receiving a configuration signal indicating that the transmission resource or the reception resource is associated with the first resource.

4. The method of claim 2, wherein the transmission resource and the reception resource are in a same time domain but are separate resources.

5. The method of claim 2, wherein the first network node is a base station and the second network node is a user equipment (UE), and wherein the method further comprises:
transmitting the reservation signal on the transmission resource for the DL transmission, or on the reception resource for the UL transmission; and
monitoring the reception resource for the DL transmission or the transmission resource for the UL transmission to determine a reservation of the first resource by another base station.

6. The method of claim 5, further comprising:
transmitting, to the UE, an indication of the DL transmission by the base station to inform the UE to transmit on the reception resource and monitor the transmission resource, or an indication of the UL transmission by the base station to inform the UE to transmit on the transmission resource and monitor the reception resource.

7. The method of claim 2, wherein the first network node is a user equipment (UE) and the second network node is a base station, and wherein the method further comprises:
transmitting the reservation signal on the reception resource for the DL transmission, or on the transmission resource for the UL transmission; and
monitoring the transmission resource for the DL transmission or the reception resource for the UL transmission to determine a reservation of the first resource by another UE.

8. The method of claim 1, further comprising:
monitoring the reservation signal resource to determine a priority of a second reservation signal from another node, wherein use of the first resource by the first network node is in response to a priority of the reservation signal being greater than the priority of the second reservation signal.

9. The method of claim 8, wherein the priority of the reservation signal and the priority of the second reservation signal are based on whether the first resource is being used for the DL transmission or the UL transmission.

10. The method of claim 9, wherein the priority of the second reservation signal is indicated in the second reservation signal.

11. A first network node, comprising:
a memory storing instructions; and
one or more processors coupled with the memory and configured to execute the instructions to:
select a first resource to reserve for use of a downlink (DL) transmission or an uplink (UL) transmission; and
transmit, to a second network node, a reservation signal on a reservation signal resource to announce that the first resource is reserved for use of the DL transmission or the UL transmission by the first network node, wherein the reservation signal resource is associated with the first resource and includes a system frame number (SFN) to indicate the DL transmission or the UL transmission.

12. The first network node of claim 11, wherein the reservation signal resource includes a transmission resource and a reception resource that are associated with the first resource.

13. The first network node of claim 12, wherein the one or more processors are further configured to execute the instructions to:
receive a configuration signal indicating that the transmission resource or the reception resource is associated with the first resource.

14. The first network node of claim 12, wherein the transmission resource and the reception resource are in a same time domain but are separate resources.

15. The first network node of claim 12, wherein the first network node is a base station and the second network node is a user equipment (UE), and wherein the one or more processors are further configured to execute the instructions to:
transmit the reservation signal on the transmission resource for the DL transmission, or on the reception resource for the UL transmission; and
monitor the reception resource for the DL transmission or the transmission resource for the UL transmission to determine a reservation of the first resource by another base station.

16. The first network node of claim 15, wherein the one or more processors are further configured to execute the instructions to:
transmit, to the UE, an indication of the DL transmission by the base station to inform the UE to transmit on the reception resource and monitor the transmission resource, or an indication of the UL transmission by the base station to inform the UE to transmit on the transmission resource and monitor the reception resource.

17. The first network node of claim 12, wherein the first network node is a user equipment (UE) and the second network node is a base station, and wherein the one or more processors are further configured to execute the instructions to:
transmit the reservation signal on the reception resource for the DL transmission, or on the transmission resource for the UL transmission; and
monitor the transmission resource for the DL transmission or the reception resource for the UL transmission to determine a reservation of the first resource by another UE.

18. The first network node of claim 11, wherein the one or more processors are further configured to execute the instructions to:
monitor the reservation signal resource to determine a priority of a second reservation signal from another node, wherein use of the first resource by the first network node is in response to a priority of the reservation signal being greater than the priority of the second reservation signal.

19. The first network node of claim 18, wherein the priority of the reservation signal and the priority of the second reservation signal are based on whether the first resource is being used for the DL transmission or the UL transmission.

20. The first network node of claim 18, wherein the priority of the second reservation signal is indicated in the second reservation signal.

21. A non-transitory computer-readable medium storing computer-executable code for a first network node, the computer-readable medium comprising code to:
select a first resource to reserve for use of a downlink (DL) transmission or an uplink (UL) transmission; and
transmit, to a second network node, a reservation signal on a reservation signal resource to announce that the first resource is reserved for use of the DL transmission or the UL transmission by the first network node, wherein the reservation signal resource is associated with the first resource and includes a system frame number (SFN) to indicate the DL transmission or the UL transmission.

22. The non-transitory computer-readable medium of claim 21, wherein the reservation signal resource includes a transmission resource and a reception resource that are associated with the first resource.

23. The non-transitory computer-readable medium of claim 22, further comprising code to:
receive a configuration signal indicating that the transmission resource or the reception resource is associated with the first resource.

24. The non-transitory computer-readable medium of claim 22, wherein the transmission resource and the reception resource are in a same time domain but are separate resources.

25. The non-transitory computer-readable medium of claim 22, wherein the first network node is a base station and the second network node is a user equipment (UE), and wherein the computer-readable medium further comprises code to:
transmit the reservation signal on the transmission resource for the DL transmission, or on the reception resource for the UL transmission; and
monitor the reception resource for the DL transmission or the transmission resource for the UL transmission to determine a reservation of the first resource by another base station.

26. The non-transitory computer-readable medium of claim 25, further comprising code to:
transmit, to the UE, an indication of the DL transmission by the base station to inform the UE to transmit on the reception resource and monitor the transmission resource, or an indication of the UL transmission by the base station to inform the UE to transmit on the transmission resource and monitor the reception resource.

27. The non-transitory computer-readable medium of claim 22, wherein the first network node is a user equipment (UE) and the second network node is a base station, and wherein the computer-readable medium further comprises code to:
transmit the reservation signal on the reception resource for the DL transmission, or on the transmission resource for the UL transmission; and
monitor the transmission resource for the DL transmission or the reception resource for the UL transmission to determine a reservation of the first resource by another UE.

\* \* \* \* \*